(12) United States Patent
Neubauer

(10) Patent No.: US 8,549,753 B2
(45) Date of Patent: Oct. 8, 2013

(54) METHODS OF MANUFACTURING A MODULAR PULLING ROLL

(75) Inventor: Dean Veral Neubauer, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 1182 days.

(21) Appl. No.: 12/465,831

(22) Filed: May 14, 2009

(65) Prior Publication Data

US 2010/0292062 A1  Nov. 18, 2010

(51) Int. Cl.
*B21D 53/00* (2006.01)

(52) U.S. Cl.
USPC ............. 29/895.213; 29/895.21; 29/895.23; 29/898.054; 492/40

(58) Field of Classification Search
USPC .................. 492/40, 41; 29/895.213, 895.21, 29/895.23, 898.054
See application file for complete search history.

(56) References Cited

U.S. PATENT DOCUMENTS

| | | | | |
|---|---|---|---|---|
| 1,930,999 A * | 10/1933 | Gaskell | .................. | 65/370.1 |
| 3,334,010 A * | 8/1967 | Moore | ...................... | 162/154 |
| 3,338,696 A | 8/1967 | Dockerty | | |
| 3,456,931 A * | 7/1969 | Ermenc et al. | ................ | 432/246 |
| 3,682,609 A | 8/1972 | Dockerty | | |
| 3,763,533 A | 10/1973 | Blom et al. | ....................... | 29/132 |
| 3,847,260 A * | 11/1974 | Fowler | ............................ | 193/37 |
| 4,216,005 A | 8/1980 | Gladieux et al. | | |
| 4,283,821 A | 8/1981 | Paakkunainen | | |
| 4,352,230 A * | 10/1982 | Sukenik | ......................... | 492/40 |
| 4,397,673 A * | 8/1983 | Stevens | ...................... | 65/374.11 |
| 4,459,148 A | 7/1984 | Diederen et al. | | |
| 4,487,631 A | 12/1984 | Britt et al. | ......................... | 106/80 |
| 4,577,674 A | 3/1986 | Harada et al. | | |
| 4,577,675 A | 3/1986 | Ishihara et al. | | |
| 4,669,163 A * | 6/1987 | Lux et al. | ......................... | 492/41 |
| 5,097,596 A | 3/1992 | Hoogesteger et al. | ..... | 29/895.21 |
| 5,257,965 A | 11/1993 | Fuchs et al. | | |
| 5,307,563 A | 5/1994 | Svenka | | |
| 5,483,812 A | 1/1996 | Dempsey | | |
| 5,484,371 A | 1/1996 | Gautier | | |
| 5,709,639 A | 1/1998 | Hart et al. | | |
| 5,765,256 A * | 6/1998 | Allan et al. | ..................... | 492/41 |
| 6,685,611 B1 | 2/2004 | Kark | | |
| 6,716,147 B1 * | 4/2004 | Hinkle et al. | .................. | 492/45 |
| 6,896,646 B2 | 5/2005 | Kaiser et al. | .................... | 492/40 |
| 7,507,194 B2 | 3/2009 | Neubauer et al. | | |
| 7,624,646 B2 | 12/2009 | Neubauer | | |
| 7,781,043 B2 | 8/2010 | Nakayama et al. | | |
| 8,002,687 B2 | 8/2011 | Heighway | | |
| 8,024,985 B2 | 9/2011 | Neubauer | | |
| 2004/0007021 A1 | 1/2004 | Igo et al. | | |
| 2004/0192526 A1 | 9/2004 | Nakayama et al. | | |

(Continued)

FOREIGN PATENT DOCUMENTS

| | | |
|---|---|---|
| CN | 1103236 A | 5/1995 |
| CN | 1549795 A | 11/2004 |

(Continued)

*Primary Examiner* — Sarang Afzali

(74) *Attorney, Agent, or Firm* — Jeffrey A. Schmidt

(57) ABSTRACT

Methods for the preparation of a pulling roll including a sleeve (800) and/or a cartridge (1330) are disclosed. Also disclosed are methods for the change or repair of at least a portion of a heat resistant material of a pulling roll. Also disclosed are a sleeve and a cartridge for use with a pulling roll, each including a heat resistant material.

5 Claims, 6 Drawing Sheets

(56) References Cited

U.S. PATENT DOCUMENTS

| | | |
|---|---|---|
| 2004/0220032 A1 | 11/2004 | Nakayama et al. |
| 2005/0268657 A1 | 12/2005 | Adamowicz et al. ............. 65/53 |
| 2005/0268658 A1 | 12/2005 | Adamowicz et al. ............. 65/53 |
| 2007/0042883 A1* | 2/2007 | Daily et al. ..................... 492/40 |
| 2008/0120995 A1 | 5/2008 | Neubauer et al. ............. 65/33.7 |
| 2009/0272151 A1 | 11/2009 | Lacasse et al. |
| 2010/0064729 A1 | 3/2010 | Nakayama et al. |
| 2010/0218559 A1 | 9/2010 | Bucko et al. |
| 2010/0240511 A1 | 9/2010 | Nakayama et al. |
| 2011/0259538 A1 | 10/2011 | Nakayama et al. |
| 2011/0287915 A1 | 11/2011 | Horiuchi et al. |
| 2011/0287916 A1 | 11/2011 | Watanabe et al. |
| 2012/0004084 A1 | 1/2012 | Neubauer |
| 2012/0073103 A1 | 3/2012 | March et al. |
| 2012/0090357 A1 | 4/2012 | Nakamura et al. |

FOREIGN PATENT DOCUMENTS

| | | |
|---|---|---|
| CN | 1550464 A | 12/2004 |
| CN | 2695440 Y | 4/2005 |
| CN | 1871186 A | 11/2006 |
| CN | 101010262 A | 8/2007 |
| CN | 101045638 A | 10/2007 |
| CN | 200964380 Y | 10/2007 |
| CN | 101360690 A | 2/2009 |
| CN | 101676235 A | 3/2010 |
| CN | 201981121 U | 9/2011 |
| CN | 202008290 U | 10/2011 |
| CN | 202046997 U | 11/2011 |
| CN | 102336513 A | 2/2012 |
| CN | 202070298 U | 3/2012 |
| CN | 202246386 U | 5/2012 |
| CN | 202297355 U | 7/2012 |
| JP | 05/124826 | 5/1993 |
| JP | 2004/043240 | 2/2004 |
| JP | 2005520774 A | 7/2005 |
| JP | 4107642 B2 | 6/2008 |
| JP | 2008/266070 | 11/2008 |
| JP | 2008266070 A | 11/2008 |
| JP | 2010530348 A | 9/2010 |
| JP | 4974053 B2 | 7/2012 |
| JP | 2012087004 | 10/2012 |
| KR | 20030091304 A | 12/2003 |
| KR | 20040007270 A | 1/2004 |
| TW | 200848377 A | 12/2008 |
| WO | 03011778 A2 | 2/2003 |
| WO | 2005042433 A1 | 12/2005 |
| WO | 2008157464 A1 | 12/2008 |
| WO | 2010/111341 | 9/2010 |
| WO | 2012070650 A1 | 5/2012 |

\* cited by examiner

METHODS OF MANUFACTURING A MODULAR PULLING ROLL

BACKGROUND

1. Field

The present disclosure relates to the manufacture of sheet glass. More particularly, the present disclosure relates to pulling rolls for use in the manufacture of sheet glass by, for example, the overflow downdraw fusion process and methods for the manufacture thereof.

2. Technical Background

Pulling rolls are used in the manufacture of sheet glass to apply tension to the ribbon of glass from which the sheets are formed and thus control the nominal sheet thickness. For example, in the overflow downdraw fusion process (see Dockerty, U.S. Pat. Nos. 3,338,696 and 3,682,609), pulling rolls are placed downstream of the tip or root of the fusion pipe and are used to adjust the rate at which the formed ribbon of glass leaves the pipe and thus determine the nominal thickness of the finished sheet.

A successful pulling roll can meet a number of conflicting criteria. A pulling roll should be able to withstand the high temperatures associated with newly formed glass for substantial periods of time. The longer a pulling roll can last in such an environment the better, since the time required for roll replacement reduces the amount of finished glass a given machine can produce and thus increases the ultimate cost of the glass. A pulling roll should also be able to provide sufficient pulling force to control the thickness of glass sheet produced in the process and should not give off excessive amounts of particles that can adhere to the glass and form surface defects thereon.

As the performance and life expectancy of conventional pulling rolls is typically limited by the materials of manufacture, physical properties of the roll, and operating conditions, roll replacement can result in significant disruptions in the glass production process and significant costs to ship a roll to, for example, a roll manufacturer for repair or rebuilding. Conventional pulling rolls, once formed, cannot be dismantled without adversely affecting the properties and performance of the roll. Even recovery of the roll shaft for use in manufacturing a new roll can be costly and time consuming. Thus, there is a need in the art to obtain a pulling roll that can be repaired and/or rebuilt without incurring significant cost and time. This and other needs are satisfied by the methods and compositions of the present disclosure.

SUMMARY

The present disclosure relates to pulling rolls for glass manufacture and methods for making pulling rolls.

In one aspect, the present disclosure provides a method for preparing a pulling roll, the method comprising positioning a plurality of fired discs of a millboard material onto a shaft in a face to face manner, axially compressing the plurality of fired discs, firing the axially compressed plurality of fired discs at a temperature and for a time sufficient to fuse at least a portion of the plurality of fired discs together to form a sleeve, and then removing the sleeve from the shaft.

In a second aspect, the present disclosure provides a method comprising positioning and securing a sleeve of a heat resistant material onto a pulling roll shaft, wherein the sleeve comprises a plurality of fired heat resistant discs that have been at least partially fused together.

In a third aspect, the present disclosure provides a method for preparing a pulling roll cartridge, the method comprising positioning a plurality of discs of a millboard material onto a hollow cylindrical spindle in a face to face manner, and axially compressing the plurality of discs, wherein the hollow cylindrical spindle has a plurality of keys disposed on an interior surface thereof, adapted to be in registration with a plurality of keyways on a pulling roll shaft.

In a fourth aspect, the present disclosure provides a method of assembling a pulling roll comprising positioning and securing a cartridge onto a pulling roll shaft, wherein the cartridge comprises a heat resistant material disposed on a hollow cylindrical spindle having a plurality of keys disposed on an interior surface of the hollow cylindrical spindle, wherein the pulling roll shaft comprises a plurality of keyways disposed in a surface and extending along an axis thereof, and wherein the keyways are located on the shaft so that the interaction of the keys and keyways locates the cartridge at a desired axial position on the pulling roll shaft.

In a fifth aspect, the present disclosure provides a cartridge comprising a hollow cylindrical spindle and a cylinder of a heat resistant material disposed thereon, wherein the hollow cylindrical spindle comprises a plurality of keys disposed on an interior surface thereof, and wherein the cartridge is capable of being positioned on a pulling roll shaft.

In a sixth aspect, the present disclosure provides a pulling roll system comprising: a pulling roll shaft and at least one cartridge disposed thereon, wherein the pulling roll shaft comprises a plurality of keyways disposed in a surface and extending along the axis thereof, wherein at least one cartridge comprises a hollow cylindrical spindle having a cylinder of a heat resistant material disposed thereon and having a plurality of keys positioned along an interior surface of the hollow cylindrical spindle, and wherein the keyways are located on the shaft so that the interaction of the keys and keyways locates the cartridge at a desired axial position on the pulling roll shaft.

In a seventh aspect, the present disclosure provides a method of making a glass sheet comprising: applying tension to a ribbon of glass with a pulling roll, the pulling roll having a shaft and a cartridge as described herein disposed on the shaft; and separating a glass sheet from the ribbon of glass.

Additional aspects of the invention will be set forth, in part, in the detailed description and any claims that follow, and in part will be derived from the detailed description, or can be learned by practice of the disclosed exemplary embodiments. The advantages described below will be realized and attained by means of the elements and combinations particularly pointed out in the appended claims. It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate certain aspects of the present disclosure and together with the description, serve to explain, without limitation, the principles of the invention. Like numbers represent the same elements throughout the figures.

Figure 1:
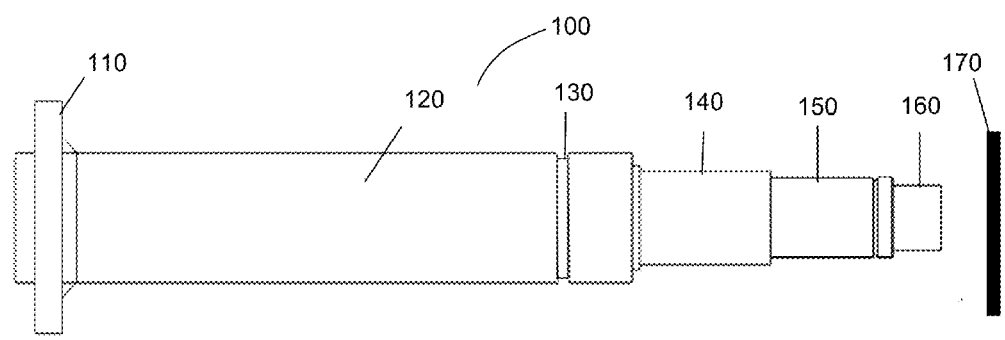
FIG. 1 is a schematic illustration of a shaft, with a split retaining ring removed, that may be used to prepare a sleeve in accordance with various aspects of the present disclosure.

Additional aspects will be set forth in part in the description which follows, and in part will be obvious from the description, or can be learned by practice of the various aspects of the disclosure. Advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present disclosure can be understood more readily by reference to the following detailed description, examples, and claims, and their previous and following description. However, before the present articles and/or methods are disclosed and described, it is to be understood that this disclosure is not limited to the specific articles and/or methods disclosed unless otherwise specified, as such can, of course, vary. It is also to be understood that the terminology used herein is for the purpose of describing particular aspects only and is not intended to be limiting.

Disclosed are materials, compounds, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

The following description is provided as an enabling teaching of principles and concepts according to the invention in its currently known embodiments. To this end, those skilled in the relevant art will recognize and appreciate that many changes can be made to the various aspects of embodiments of the invention described herein, while still obtaining beneficial results of the present invention. It will also be apparent that some of the desired benefits of the present invention can be obtained by selecting some of the features of the present disclosure without utilizing other features or attaining other benefits. Accordingly, those who work in the art will recognize that many modifications and adaptations to the present invention are possible and can even be desirable in certain circumstances and are a part of the present disclosure. Thus, the following description is provided as illustrative of the principles of the present invention and not in limitation thereof.

As used herein, the singular forms "a," "an" and "the" include plural referents unless the context clearly dictates otherwise. Thus, for example, reference to a "component" includes aspects having two or more such components, unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, a "wt. %" or "weight percent" or "percent by weight" of a component, unless specifically stated to the contrary, is based on the total weight of the composition in which the component is included.

As used herein, "compressibility" refers to the relative volume change of a material as a response to an applied pressure. For example, compressibility of a pulling roll refers to the change in thickness of the assembled heat resistant discs, or length of the assembled pulling roll, upon application of a compressive axial force.

As used herein, "recovery" refers to the ability of a compressed material to expand after removal of an applied pressure. For example, recovery of a pulling roll refers to the expansion in thickness of millboard pieces (or of the length of a sleeve) upon either removal of an axial compressive force or upon elongation of the pulling roll shaft by, for example, thermal expansion.

As briefly described above, the present disclosure provides improved compositions and methods for use in preparing pulling rolls that can be used, for example, in the manufacture of sheet glass. In various aspects, the present disclosure provides modular components for a pulling roll. Such modular components can, in various aspects, be quickly replaced at the point of use to minimize downtime and costs associated with shipment and repair of pulling rolls. In one aspect, the modular component can comprise a sleeve of fired, compressed, heat resistant discs that have been at least partially fused together so the sleeve can be positioned on and removed from a pulling roll shaft as a single unit. In another aspect, the modular component can comprise a cartridge comprising a spindle onto which a cylinder of heat resistant material is disposed, wherein the cartridge is configured to slide onto a pulling roll shaft.

Pulling Roll

A pulling roll can comprise one or more fittings positioned along a shaft. Such fittings can comprise a collar (fixed, movable and/or removable), a locking ring, a snap ring, a split retaining ring, or other device capable of securing one or more heat resistant discs in place on the shaft. In one aspect, any device capable of applying an axial compressive force to the plurality of heat resistant discs mounted on a shaft can be used as a fitting.

Depending on the desired configuration of a given pulling roll, one or more regions of heat resistant discs can be positioned along the shaft. In various aspects, one, two, three, or more individual regions of heat resistant discs can be positioned along the shaft, wherein each of the regions comprises at least two fittings that can apply an axial compressive force to the heat resistant discs disposed there between.

It should be appreciated that a variety of pulling roll configurations exist in the literature and are suitable for use in the manufacture of sheet glass. U.S. Pat. No. 6,896,646 describes pulling rolls for glass sheet manufacture, and is hereby incorporated by reference in its entirety and for the specific purpose of describing methods of producing a pulling roll from millboard materials. The present disclosure is not limited to a particular pulling roll configuration or arrangement, and one of skill in the art could readily choose an appropriate pulling roll configuration.

In one aspect, a pulling roll can comprise a configuration wherein a single region of heat resistant discs extend over the length of the shaft or a portion thereof. Such a pulling roll can include one or more portions thereof specifically adapted for contacting a glass sheet, wherein the outer perimeter of the heat resistant discs in that portion extends a further distance from the shaft than do the surrounding heat resistant discs. Such a configuration can reduce the possibility of particles from the pulling roll becoming deposited on the glass sheet as onclusions. In a full roll configuration, a single region of heat resistant discs comprises two portions adapted to contact a glass sheet at different locations, for example, at opposite edges of the glass sheet. In a stub roll configuration, a single region of heat resistant discs mounted to a shaft is adapted to contact one edge of a glass sheet, wherein a separate stub roll (having a separate shaft) can be used to contact an opposite edge of the glass sheet. That is, in a stub roll configuration, one shaft does not extend across the glass sheet so as to contact both opposite edges of the glass sheet.

In another aspect, a pulling roll can comprise a bare shaft configuration, wherein two or more regions of heat resistant discs adapted to contact a glass ribbon are separated by a region of the shaft comprising no discs. Each of the individual regions can have fittings to secure the heat resistant discs in place and to provide an axial compressive force to those heat resistant discs disposed therebetween.

Pulling rolls and the millboard material that forms the exterior surface of the pulling roll capable of contacting a glass ribbon can be damaged during handling and/or use. For example, pieces of glass can become embedded in the surface of the pulling roll. Such embedded pieces can result in check marks, or small cracks, in the produced glass sheet and/or can propagate into further damage (e.g., fracture, release of millboard material) to the pulling roll.

The force used to compress a portion of a pulling roll and achieve a particular hardness can vary. In various aspects, the force can range from about 7,000 to about 30,000 lbs; from about 10,000 to about 20,000 lbs; or from about 8,000 to about 13,000 lbs. In other aspects, the force can be less than about 7,000 lbs or greater than about 30,000 lbs. Thus, a roll is typically prepared by a manufacturer having equipment suitable for applying such forces. Most end users of such a pulling roll are not equipped to repair and/or recompress a pulling roll and must return the entire roll, including the shaft, to the manufacturer to be repaired or re-assembled.

It is thus desirable to have a pulling roll wherein all or a portion of the heat resistant discs forming an exterior surface of the roll can be replaced quickly, without the need to return the roll to the manufacturer. The ability to quickly replace and/or repair the exterior surface of a pulling roll can also result in decreased production down-time.

Millboard Material & Heat Resistant Discs

An exemplary pulling roll comprises a plurality of heat resistant planar discs that are optionally fired, positioned on a shaft in face-to-face fashion, and compressed such that the exterior edge of each of the plurality of discs form an exterior surface of the pulling roll capable of contacting a glass ribbon. The specific shape, size, and composition of any one or more of the plurality of heat resistant discs can vary depending on, for example, the intended application and operating conditions of the resulting pulling roll. At least a portion of the exterior surface of the pulling roll can be adapted to contact the glass sheet.

The composition of any one or more of the heat resistant discs can vary depending upon the desired properties of the pulling roll. In one aspect, one or more discs are formed from a millboard material. In another aspect, one or more discs comprise a silicate, clay, refractory ceramic fiber, or a combination thereof. In another aspect, one or more discs comprise a commercially available millboard material, such as, for example, Nichias SD-115 (available from Nichias Corporation, Tokyo, Japan). While certain components and concentration ranges are recited herein for specific millboard materials, these are exemplary and the present invention is not intended to be limited to any particular millboard material, components, and/or concentration ranges.

In one aspect, the millboard from which at least a portion of the heat resistant discs is formed comprises an asbestos free, shot free refractory composition, such as that described in U.S. Patent Publication No. 2008/0120995, which is hereby incorporated by reference in its entirety and for the specific purpose of disclosing millboard pulling roll compositions. In various specific aspects, such a millboard can comprise, on a dry weight basis, from about 5 to about 30 weight percent refractory ceramic fiber, from about 1 to about 10 weight percent organic fiber, such as, for example, cellulose, from about 10 to about 40 weight percent magnesium silicate, such as, for example, Forsterite, from about 5 to about 32 weight percent mica, from about 10 to about 35 weight percent kaolin clay, less than about 0.5 weight percent crystalline silica, and less than about 0.8 weight percent titanium dioxide.

In one aspect, ceramic fibers for use in such a millboard material can comprise naturally occurring materials and/or man-made ceramic fibers produced from kaolinite and silica. Useful ceramic fibers can comprise fibers of various fiber grades, such grades being determined by production methods, shot content, lubrication and the like. One of skill in the art, in possession of this disclosure, could readily select appropriate ceramic fiber materials. In other aspects, such ceramic fibers can have fiber lengths up to about 5 microns, diameters up to about 3 microns, and aspect ratios of greater than about 5:1. It should be noted that these values are exemplary and other fibers can be used depending on the desired properties of the resulting pulling roll. In another aspect, a ceramic fiber material should not melt except at temperatures above about 1,760° C., and should retain physical and chemical integrity when subjected to continuous temperatures up to about 1,260° C.

An organic fiber, if used, can be any organic fiber suitable for use in a millboard material or pulling roll application. In one aspect, an organic fiber comprises cellulose. In a specific aspect, such cellulose can comprise an unbleached, semi-bleached, or bleached wood pulp. In another aspect, a millboard composition does not comprise an organic fiber, such as, for example, cellulose.

An inorganic binder, if present, can comprise one or more inorganic compounds including, such as, for example, clay, gypsum, fly ash, and alkaline ionic silicates such as silicates of sodium, potassium, or magnesium. In one aspect, an inorganic binder comprises from about 10 to about 30 weight percent kaolin clay and from about 10 to about 40 weight percent magnesium silicate based upon the total dry weight of the millboard composition.

In one aspect, an aqueous slurry of the millboard components can be prepared, a flocculant can optionally be added, and the resulting slurry formed into a sheet by, for example, depositing the slurry onto a rotating screened cylinder.

In another aspect, the millboard sheet can be compressed, during and/or after formation, to provide a uniform or substantially uniform thickness. Any residual moisture in a formed millboard sheet can be removed by, for example, heating.

In one aspect, a heat resistant disc and/or the material from which one or more heat resistant discs are cut can be fired prior to assembly to form a pulling roll so that they exhibit substantially no compositional or dimensional changes when exposed to the temperatures at which the rolls operate. For example, heat resistant discs can be heated in a firing step at a temperature of from about 650° C. to about 1,000° C., or from about 760° C. to about 1,000° C., or preferably from about 900° C. to about 1,000° C., and held for a period of at least two hours. The heat resistant discs can then be cooled to ambient temperature and assembled to form a pulling roll, or a modular component as described herein. A modular component may be, for example, a sleeve of a heat-resistant material, or a cartridge having heat resistant material disposed thereon.

Sleeve

In one aspect, the present disclosure provides a modular pulling roll design comprising a pulling roll shaft and one or more sleeves of heat resistant material. A sleeve can be formed of fired, compressed, heat resistant discs that have been at least partially fused together so that they that can be positioned onto and/or removed from a pulling roll shaft as a single unit. In such a design, damaged sections of the pulling roll can be easily and quickly replaced by personnel at the point of use, without requiring significant downtime and return shipment of the entire pulling roll to the manufacturer.

In one aspect, a sleeve can be prepared from a plurality of heat resistant discs, for example, of a millboard material that can become rigid and at least partially fused together upon compression and heating. In another aspect, a sleeve can be prepared and/or configured to a desired dimension prior to delivery to a point of use to further minimize downtime and effort required to repair a pulling roll.

A sleeve can be prepared by punching or cutting a plurality of discs from one or more sheets of a millboard material. The discs are then fired for a time and at a temperature sufficient to dry the discs and remove any volatile and/or combustible components in the discs. In one aspect, the discs are fired such that after firing they exhibit substantially no weight loss (e.g., <1.5 weight percent) when exposed to the temperatures associated with a pulling roll during use and will thus be dimensionally stable under operating conditions. For example, discs can be fired by being heated at a temperature of from about 650° C. to about 1,000° C., or from about 760° C. to about 1,000° C., or preferably from about 900° C. to about 1,000° C., and held at that temperature for a period of at least two hours, and then cooled back to room temperature before assembly onto a shaft to form the sleeve.

The fired discs are then positioned onto a shaft in a face-to-face manner. Throughout the specification, for ease in description, when the discs are referred to simply as "discs", it is with the understanding that they may be either fired or not fired prior to assembly onto a shaft to form the modular component of the pulling roll. On the other hand, "fired discs" specifically refer to discs that have been heated to dry them and remove any volatile and/or combustible components in the discs, as described above. In various aspects, the shaft used to prepare the sleeve can be a pulling roll shaft or a model shaft for use solely in preparing such a sleeve. When the shaft is a pulling roll shaft, it may or may not also be subsequently used as the pulling roll shaft of a pulling roll subsequently used to produce sheet glass. The particulars of the shaft used for preparing the sleeve are not particularly limited.

Figure 2:
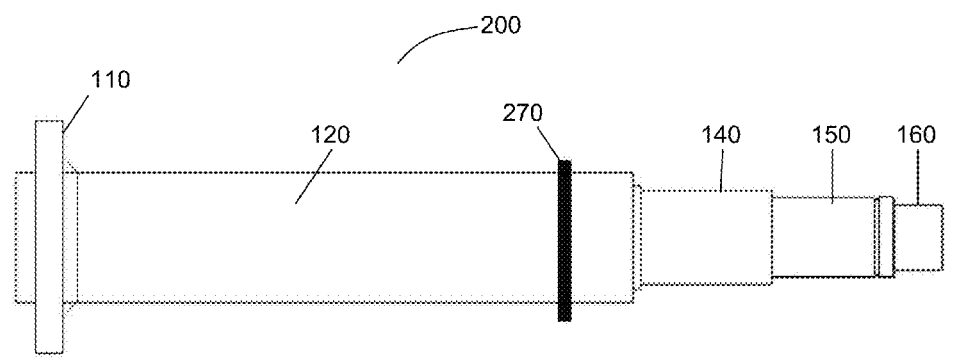
FIG. 2 is a schematic illustration of a shaft, with a snap ring installed, that may be used to prepare a sleeve in accordance with various aspects of the present disclosure.

In one aspect, the shaft is configured such that the positioned discs can be compressed in an axial manner. In various aspects, at least one end of the shaft can comprise a fixed collar or backplate to prevent movement of the discs along the length of the shaft. In another aspect, at least one end of the shaft comprises a fitting for securing, compressing, and/or preventing movement of the plurality of discs along the length of the shaft. With reference to the figures, FIG. 1 illustrates a configuration 100 of an exemplary shaft 120 having a fixed collar 110, groove 130 for receiving a split retaining ring 170, journal 140, bearing 150, drive end 160, and unattached split retaining ring 170. Similarly, the configuration 200 illustrated in FIG. 2 comprises a shaft 120, fixed collar 110, installed split retaining ring 270, journal 140, bearing 150, and drive end 160.

In another aspect, a removable collar, locking ring, or other fittings for securing and compressing the plurality of discs can be positioned either at the opposing end of the shaft and/or at one or more positions along the length of the shaft.

In a specific aspect, a shaft comprises a fixed collar positioned on one end of the shaft. In such an aspect, a plurality of fired discs can be positioned in face-to-face fashion along the shaft, abutting the fixed collar. After positioning the plurality of fired discs on the shaft, a removable collar can be positioned on the opposing end of the shaft and adjusted so as to provide a compressive axial force to the plurality of fired discs.

In one aspect, the axial compressive force applied to a plurality of fired discs can vary depending on, for example, the composition of the discs and the desired properties of a resulting sleeve. In various aspects, the axial compressive force can be from about 7,000 to about 30,000 lbs; from about 10,000 to about 20,000 lbs; or from about 8,000 to about 13,000 lbs. In other aspects, the axial compressive force can be less than about 7,000 lbs or greater than about 30,000 lbs. In another aspect, the axial compressive force is sufficient to cause, upon heating, at least a portion of the heat resistant fired discs to fuse together.

Figure 3:
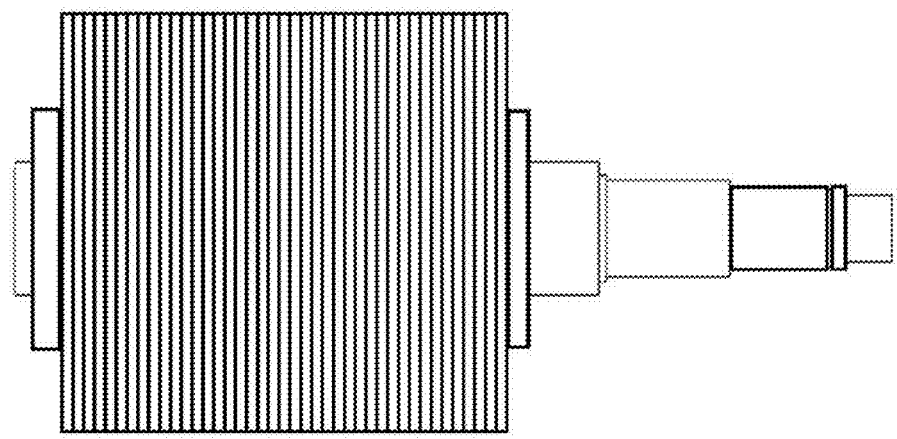
FIG. 3 is a schematic illustration of fired, compressed discs on a shaft prior to cutting to a desired dimension
Figure 4:
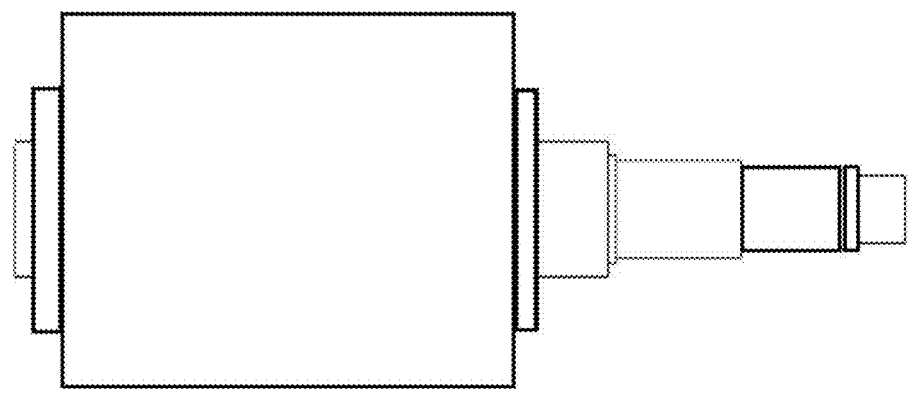
FIG. 4 is a schematic illustration of fired, compressed discs on a shaft after cutting to a desired dimension, in accordance with various aspects of the present disclosure.

After positioning and compressing the plurality of fired discs, all or a portion of the discs can optionally be cut to a desired dimension. For example, a pulling roll can be designed such that only a portion of the pulling roll contacts a glass sheet. Thus, the exterior surface of the assembly of compressed fired discs can be cut or otherwise dimensioned to provide a desired profile. In one aspect, the fired discs can be cut to provide a sleeve capable of fitting any of a variety of roll shapes and/or configurations. FIG. 3 illustrates a plurality of compressed fired discs positioned on a shaft prior to cutting, and FIG. 4 illustrates the same plurality of compressed discs after cutting to a desired dimension or profile.

The compressed assembly of fired discs can then be fired at a temperature and for a time sufficient to fuse the plurality of discs together. In one aspect, the compressed assembly of fired discs can be heated at a temperature of at least about 925° C. for a period of at least about 24 hours. In a specific aspect, a compressed assembly of fired discs is heated at a temperature of at least about 950° C. for at least about 48 hours. In another aspect, such a heating step can be performed in a kiln.

It should be understood that the specific compression, as well as time and temperature conditions for firing the compressed assembly of fired discs, can vary and that the present invention is not intended to be limited to any particular set of conditions as long as the conditions are sufficient to fuse the compressed assembly of fired discs together to form a sleeve. In one aspect, the firing time and temperature are also sufficient to form a mullite layer on at least a portion of the surface of the sleeve. Such a layer can reduce and/or eliminate dusting from the pulling roll, can result in increased hardness of the exterior surface of the pulling roll (e.g., Shore D hardness) that can contact a glass sheet, thus making the resulting roll more resistant to process damage. In another aspect, the firing time and temperature are sufficient to form a cristobalite layer on at least a portion of the surface of the sleeve.

After firing the assembly of compressed fired discs, they can be removed from the shaft as a sleeve. It is desirable that the shaft and fittings, for example collars, be designed such that the sleeve is not damaged upon removal from the shaft. In one aspect, a shaft for preparing a sleeve is designed such that the sleeve length can be controlled, for example, to match the desired length of heat resistant material for a particular pulling roll shaft onto which the sleeve will be installed. In another aspect, the surface of the shaft is sufficiently smooth and free from burrs, welds, or rough areas to allow easy removal of the sleeve.

In one aspect, a fitting for maintaining compression can comprise a snap ring designed to fit into a groove on the shaft. In another aspect, a removable collar can be threaded and designed to attach to a portion of the shaft with such threads. In such an aspect, the thread pitch should be sufficiently low (e.g., threads per inch) to prevent or reduce seizure of the removable collar. In another aspect, a fitting can be any fitting capable of maintaining the compressive force. In yet another aspect, the means for securing and compressing the assembly of fired discs on the shaft is configured such that it can be easily removed without damaging the sleeve. For example, a fitting can comprise a washer, plate, bearing, or other device designed to prevent damage to the heat resistant discs and/or sleeve when applying, maintaining, and/or releasing a compressive force applied thereto.

In various aspects, a fitting can comprise a collar (fixed, movable and/or removable), a locking ring, a split retaining ring, or other device capable of securing one or more heat resistant discs in place on a shaft or spindle, and/or securing a modular component (for example, a sleeve or a cartridge) on a pulling roll shaft. Additionally, a fitting may comprise a washer, plate, bearing, or other device designed to prevent damage to the heat resistant discs and/or sleeve when applying, maintaining, and/or releasing a compressive force applied thereto.

Figures 5, 6:
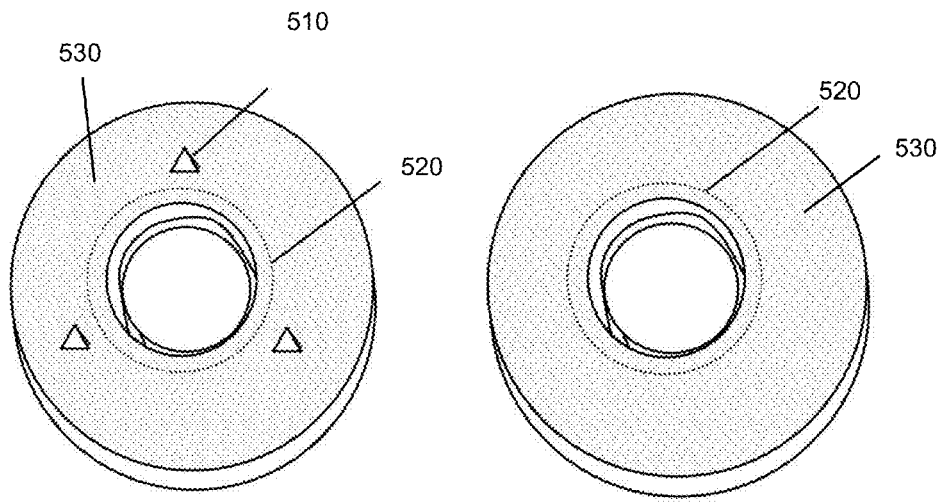
FIG. 5 is a schematic illustration of a fixed collar with cones, in accordance with various aspects of the present disclosure.
FIG. 6 is a schematic illustration of a removable collar, in accordance with various aspects of the present disclosure.
Figure 7:
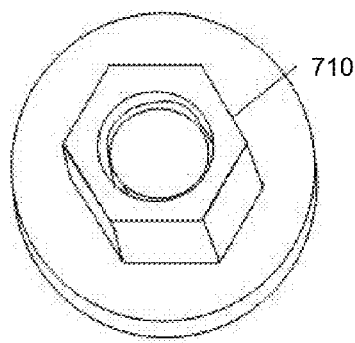
FIG. 7 is a schematic illustration of a removable collar, in accordance with various aspects of the present disclosure.

In one aspect, the fittings (for example, fixed collar, removable collar, or both) can be designed to keep the assembly of compressed discs and/or the resulting sleeve centered on the shaft. In another aspect, the fittings can be designed to minimize and/or prevent the independent rotation of the discs or sleeve about the shaft. In an exemplary aspect, as illustrated in FIGS. 5-7, a fixed collar (FIG. 5) and/or removable collar (FIGS. 6-7) can comprise one or more areas designed to securely grip the discs or sleeve and prevent rotation. In one aspect, such areas can comprise raised points or cones 510 on the surface of the collar contacting the discs or sleeve. In another aspect, such areas can comprise a raised surface 520, such as, for example, at the interior radius of the collar. In yet another aspect, such areas can comprise a textured surface 530 designed to impart resistive frictional forces on the discs or sleeve and thus, minimize or prevent rotation. In still another aspect, the surface of a removable collar (FIG. 6) designed to contact the compressed discs or sleeve can have a raised surface 520 and a textured surface 530. Further, as shown in FIG. 7, the opposing surface can comprise a threaded nut 710 to attach the collar to a shaft so as to provide compression to a plurality of discs, or so as to locate a modular component on a pulling roll shaft.

In one aspect, the assembly of compressed fired discs can be cut and/or dimensioned prior to firing to form the sleeve. In another aspect, the sleeve can be cut or dimensioned after firing the compressed assembly of fired discs. In yet another aspect, various dimensioning steps can be performed both prior to and after firing the compressed assembly of fired discs.

Figure 8:
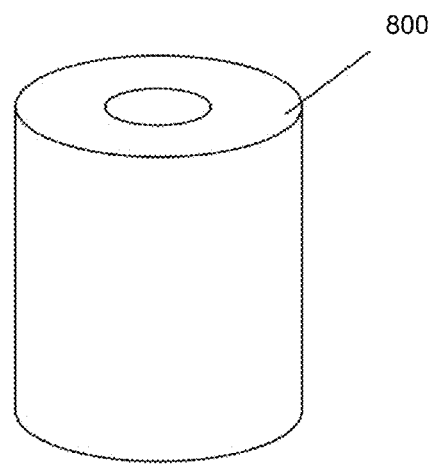
FIG. 8 is a schematic illustration of a pulling roll sleeve, in accordance with various aspects of the present disclosure.

Sleeves can be prepared and distributed in a variety of shapes, sizes, and configurations adapted to the specific needs of customers and process lines. An inventory of such sleeves can be maintained to enable quick repair of pulling rolls and thus, minimize process downtime. An exemplary sleeve 800 is illustrated in FIG. 8.

In one aspect, a damaged portion of a pulling roll can be replaced by removing the removable collar from the pulling roll shaft, removing the damaged sleeve, installing a new sleeve, and replacing the removable collar. The repaired pulling roll can be returned to service with minimal disruption to production and avoidance of the time and cost associated with returning a pulling roll to the roll manufacturer.

In one aspect, the selection of millboard material, number of fired discs, and assembly method can be designed so as to prepare a pulling roll and/or a sleeve having a target bulk density. Such an approach can determine the hardness of the resulting pulling roll assembly. By using fired discs to form the sleeve, the length, target bulk density, and/or hardness, of the resulting sleeve are more easily achieved.

Cartridge

In another aspect, the present disclosure provides a modular pulling roll, wherein the modular component is a cartridge comprising a spindle and a cylinder of heat resistant material disposed thereon. In one aspect, the cylinder of heat resistant material may form a sleeve formed from a compressed assembly of heat resistant discs. In another aspect, the cylinder of heat resistant material may be formed as a compressed assembly of discs. In one aspect, such a cartridge comprises compressed discs cut and/or dimensioned to a desired profile. In various aspects, a cartridge can be dimensioned prior to assembly, after assembly, and/or at the point of use. For example, a cartridge can be produced to a desired dimension and shipped to a point of use for final cutting and installation on a pulling roll.

As with the modular sleeve described herein, a damaged cartridge can be removed and replaced without requiring return of the entire pulling roll to the manufacturer.

In one aspect, a cartridge can be prepared by cutting and/or punching discs from one or more sheets of a millboard material. The discs can then be fired for a time and at a temperature sufficient to dry the discs and remove any volatile and/or combustible components in the discs. For example, the discs can be fired such that they exhibit substantially no weight loss (e.g., <1.5 weight percent) when exposed to the temperatures associated with a pulling roll during use and will thus be dimensionally stable under operating conditions. For example, discs can be heated at a temperature of from about 650° C. to about 1,000° C., or from about 760° C. to about 1,000° C., or preferably from about 900° C. to about 1,000°

C., and held at that temperature for a period of at least two hours, and then cooled back to room temperature before assembly into a cartridge.

A spindle of the present invention can be of any suitable material and/or design for use with a pulling roll. In one aspect, a spindle comprises a ceramic material. In another aspect, a spindle comprises a metal. In yet another aspect, a spindle comprises a material that can withstand the temperatures typically incurred during glass production and pulling roll use. In still another aspect, a spindle comprises a material that is resistant or substantially resistant to oxidation or chemical attack. In still other aspects, the spindle has a coefficient of thermal expansion that is matched or substantially matched to at least one of the pulling roll shaft and/or heat resistant discs.

Figure 9:
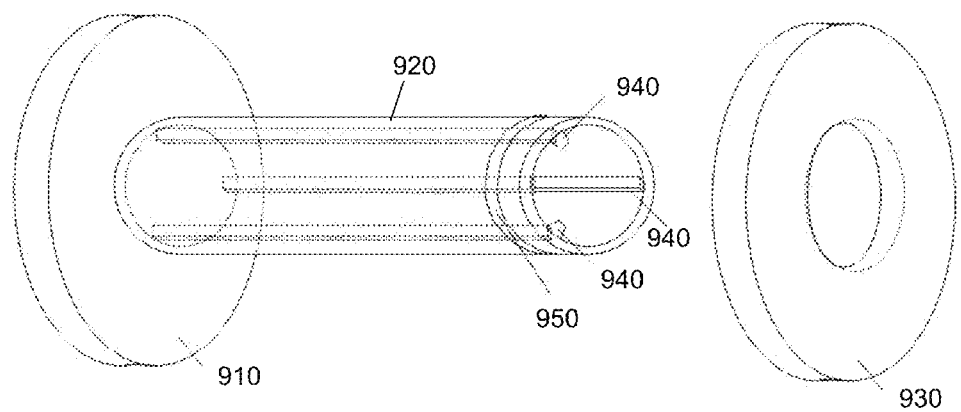
FIG. 9 is a schematic illustration of a fixed collar and removable collar of a spindle, in accordance with various aspects of the present disclosure.

A spindle can comprise any geometry suitable for use with a pulling roll. In one aspect, as shown in FIG. 9, a spindle 920 comprises a hollow spindle tube having a locking collar, flange 910, or other fittings attached to one end of the tube that can limit movement of heat resistant discs along the spindle tube. The fittings used to assemble a cartridge, and/or to locate a cartridge on a pulling roll shaft, may be similar to those described above in connection with the sleeve embodiment. In another aspect, the locking collar, flange, or other fitting positioned on the spindle 920 has an opening in registration with the hollow portion of the spindle tube, such that the spindle can at least partially slide over a pulling roll shaft.

The discs can then be positioned onto the spindle tube in a face-to-face manner. The positioned discs can be compressed and held in place with any suitable fittings as described herein, such as, for example, snap ring or removable collar. In one aspect, the discs can be held in place with a snap ring 930 and a groove 950 for receiving and positioning such snap ring. The groove 950 can be cut into the circumference of the spindle tube. After assembling and positioning the discs, the assembly can optionally be fired to remove any remaining water, volatile, and/or combustible components from the heat resistant material.

After positioning the discs on the spindle, the discs can be axially compressed along the spindle tube. Such a compression step can comprise any suitable technique, such as, for example, a hydraulic press. After compression, any device or means suitable for securing the discs and maintaining the compression thereof can be positioned on the spindle. In one aspect, a snap ring is positioned in a pre-cut groove on the spindle tube to maintain compression of the discs on the cartridge.

Once positioned and compressed on the spindle tube, the discs can optionally be cut and/or dimensioned to a desired profile. As described herein with respect to a sleeve, at least one of the locking collar and/or removable collar of a spindle can optionally comprise a raised area, textured area, cones, or other means to prevent independent rotation of the heat resistant discs about the spindle tube.

Figure 10:
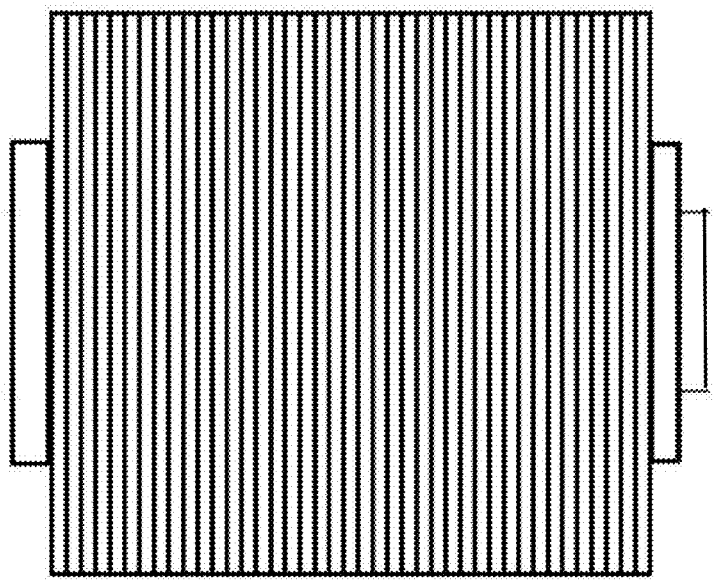
FIG. 10 is a schematic illustration of a cartridge prior to cutting to a desired dimension, in accordance with various aspects of the present disclosure.
Figure 11:
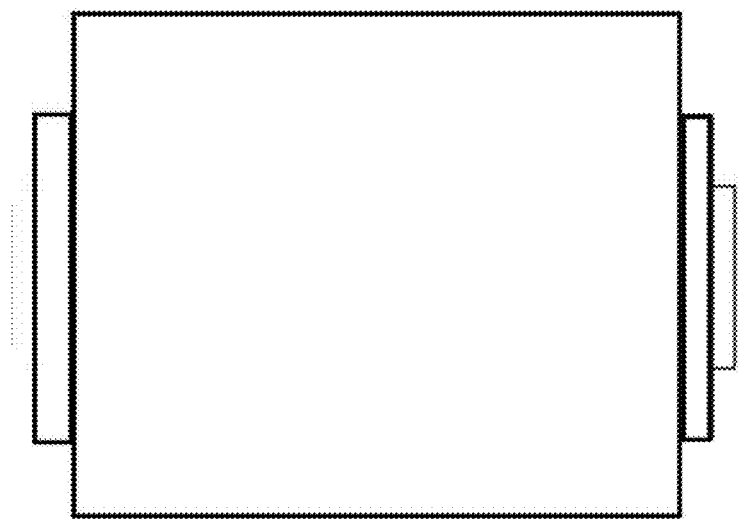
FIG. 11 is a schematic illustration of a cartridge after cutting to a desired dimension, in accordance with various aspects of the present disclosure.

A cartridge comprising a spindle and compressed discs prior to a cutting step and after a cutting step to dimension the surface of the cartridge, is illustrated in FIGS. 10 and 11, respectively.

Figure 12:
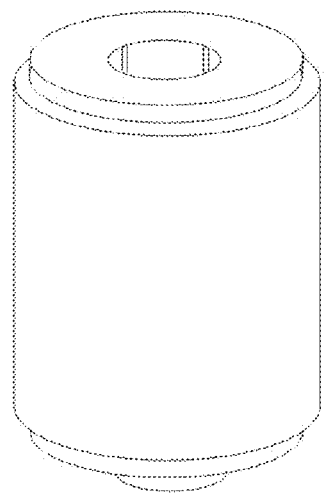
FIG. 12 is a perspective view of a cartridge, in accordance with various aspects of the present disclosure.

In one aspect, a cartridge comprising the compressed discs can be fired and cut to a desired dimension just prior to use. In another aspect, a cartridge can be put into service, such that the operational temperatures to which the cartridge is exposed during use provide the desired hardness. In one aspect, the cartridge has and/or develops a mullite layer on at least a portion of the exterior surface of the cartridge. In another aspect, a cartridge has and/or develops a cristobalite layer on at least a portion of the exterior surface of the cartridge. FIG. 12 illustrates a cartridge ready for use, in accordance with the various aspects of the present invention.

As described with respect to the sleeve herein, a damaged cartridge can be easily removed from a pulling roll and replaced with reduced downtime and/or cost.

To prevent independent rotation of the cartridge about the pulling roll shaft onto which it can be disposed, one or more keys 940 can be positioned along the interior surface of the spindle tube, parallel to the spindle axis. In such an aspect, the pulling roll shaft can have one or more keyways cut or otherwise formed into the surface thereof. As illustrated in FIG. 9, a spindle 920 can have multiple keys 940 positioned on the interior surface of the spindle tube.

Each of the one or more keys can be matched to a corresponding keyway in a pulling roll shaft. In one aspect, at least one key is disposed on the interior surface of a spindle tube and at least one corresponding keyway is disposed or cut into the surface of the pulling roll shaft. In such an aspect, the key and keyway can be in registration when the spindle is positioned on the pulling roll shaft. In another aspect, at least two keys and corresponding keyways are present. In another aspect, at least three keys and corresponding keyways are present.

In one aspect, a plurality of keys and keyways can improve the alignment of a cartridge on a pulling roll shaft. In another aspect, a plurality of keys and keyways can prevent movement, such as, for example, wobble, between the cartridge and the pulling roll shaft during operation. Such movement, if not limited, can result in irregular glass production and/or damage to the pulling roll shaft, cartridge, or a combination thereof.

In another aspect, the shape of any one or more keys and/or keyways can vary, provided that each key/keyway pair can be in registration when the cartridge is positioned on the pulling roll shaft. In various aspects, a key can comprise a protruding square rib, rectangular rib, trapezoidal rib, or other shape corresponding to at least one keyway on a pulling roll shaft.

In one aspect, positioning of the one or more keys on the interior surface of a spindle tube can improve the lifetime of a pulling roll shaft. Since a common mode of failure for a key/keyway system is the breakage or failure of a protruding key, positioning the keys on the cartridge shifts the mode of failure from the expensive and more permanent pulling roll shaft to the replaceable cartridge. Thus, if a failure occurs, the entire pulling roll can be repaired and quickly returned to service by replacing the damaged cartridge.

Installation of a cartridge onto a pulling roll shaft can comprise sliding the cartridge onto the pulling roll shaft and mating each optional key to a corresponding keyway in the surface of the pulling roll shaft. A retaining ring, locking collar, or other fitting or device can then be used to keep the cartridge on the shaft and minimize movement and/or slippage. In one aspect, fittings may be used on both ends of a cartridge to hold it in a desired axial position on the pulling roll shaft. In another aspect, a thread can be disposed on the pulling roll shaft whereby a threaded nut can be secured thereto. The threads have a sufficiently low thread pitch (e.g., threads per inch) to prevent seizure with the retaining ring.

In still another aspect, the keyways disposed and/or cut into the surface of the pulling roll shaft can be designed so as to position a cartridge at a fixed point along the axis of the pulling roll shaft. For example, a pulling roll shaft having an end onto which a cartridge will be disposed, can have one or more keyways cut into its surface, extending along at least a portion of the length of the pulling roll shaft. One or more of the keyways may have a structure at a predetermined position along the pulling roll shaft such that when a cartridge is positioned on and slid along the pulling roll shaft, the cartridge stops when the corresponding key can no longer be slid along the keyway. The keyways thus interact with the keys to locate the heat resistant material at the desired location for contacting the glass sheet. For example, the key may contact a terminating point of the keyway. Alternatively, the keyway may change depth to prevent movement of the key past a certain point. As a further alternative, the key need not act directly against the structure in the keyway that prevents movement, but an intermediary member may be used between them. Such a design can be useful in limiting the need for locking mechanisms on both ends of a cartridge, reducing variability in positioning of a cartridge on a pulling roll shaft, and reducing the time and manpower needed to replace one or more cartridges. Such a locating structure can be disposed on a pulling roll shaft wherever it is desired to mount the heat resistant material that will contact the glass sheet. For example, both ends of a bare shaft pulling roll can have such an arrangement. In other aspects, a pattern of keyways (for example, number and/or angular position) can be disposed into a pulling roll shaft surface such that a plurality of cartridges can be assembled, each to a predetermined point on the shaft. Additionally, or as an alternative to the foregoing, a pattern of keyways may be sued to match a particular cartridge to a specific type of pulling roll (for example, bare shaft, or stub roll).

Figure 13:
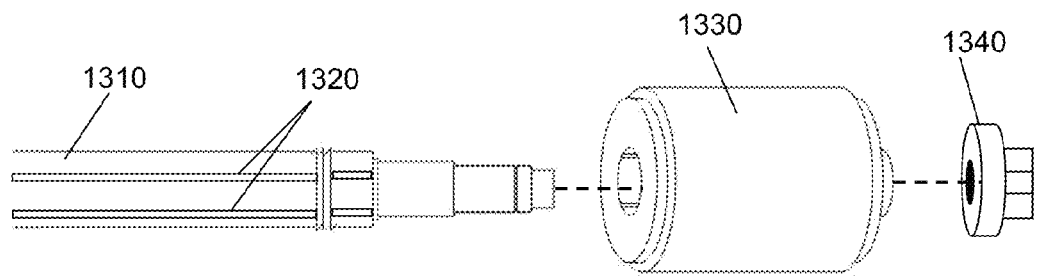
FIG. 13 is an illustration of a pulling roll shaft, cartridge, and locking collar, in accordance with various aspects of the present disclosure.

FIG. 13 illustrates an exemplary cartridge and pulling roll shaft design comprising a pulling roll shaft 1310 having keyways 1320 disposed along its surface and threads onto which a retaining ring with an attached nut 1340 can be secured after installation of a cartridge 1330 thereon. The pulling roll shaft further comprises a journal, bearing, and drive end.

Throughout this application, various publications are referenced. The disclosures of these publications in their entireties are hereby incorporated by reference into this application in order to more fully describe the compounds, compositions and methods described herein.

Various modifications and variations can be made to the components, compositions and methods described herein. Other aspects of the components, compositions and methods described herein will be apparent from consideration of the specification and practice of the components, compositions and methods disclosed herein. It is intended that the specification and examples be considered as exemplary.

What is claimed is:

1. A method for preparing a pulling roll, the method comprising:
   a. positioning a plurality of fired discs of a millboard material onto a shaft in a face to face manner;
   b. axially compressing the plurality of fired discs;
   c. firing the axially compressed plurality of fired discs at a temperature and for a time sufficient to fuse at least a portion of the plurality of fired discs together to form a sleeve; and then
   d. removing the sleeve from the shaft.

2. The method of claim 1, further comprising, after removing the sleeve from the shaft, positioning the sleeve on a pulling roll shaft.

3. The method of claim 1, further comprising cutting and/or dimensioning an exterior surface of the plurality of fired discs or of the sleeve to a predetermined profile.

4. The method of claim 1, wherein firing comprises heating at a temperature of at least about 925° C. for a period of at least about 24 hours.

5. The method of claim 1, wherein the sleeve does not comprise a core.

* * * * *